United States Patent
Takano et al.

(10) Patent No.: US 9,274,287 B2
(45) Date of Patent: Mar. 1, 2016

(54) OPTICAL FIBER CONNECTOR AND FERRULE

(71) Applicant: SENKO ADVANCED COMPONENTS, INC., Marborough, MA (US)

(72) Inventors: Kazuyoshi Takano, Westborough, MA (US); Jimmy Jun-Fu Chang, Worcester, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 14/276,999

(22) Filed: May 13, 2014

(65) Prior Publication Data
US 2015/0331201 A1    Nov. 19, 2015

(51) Int. Cl.
 *G02B 6/38* (2006.01)
(52) U.S. Cl.
 CPC ............ *G02B 6/3829* (2013.01); *G02B 6/3882* (2013.01); *G02B 6/3883* (2013.01); *G02B 6/38* (2013.01); *G02B 6/3807* (2013.01); *G02B 6/389* (2013.01); *G02B 6/3847* (2013.01); *G02B 6/3849* (2013.01); *G02B 6/3851* (2013.01); *G02B 6/3885* (2013.01)
(58) Field of Classification Search
 CPC ...... G02B 6/38; G02B 6/3807; G02B 6/3885; G02B 6/3882; G02B 6/389; G02B 6/3847; G02B 6/3849; G02B 6/3851
 USPC ............ 385/53–54, 56, 59–60, 65, 71–72, 83
 See application file for complete search history.

(56) References Cited

U.S. PATENT DOCUMENTS

| | | | |
|---|---|---|---|
| 4,150,790 | A | 4/1979 | Potter |
| 4,327,964 | A | 5/1982 | Haesly et al. |
| 4,762,388 | A | 8/1988 | Tanaka et al. |
| 4,764,129 | A | 8/1988 | Jones et al. |
| 4,840,451 | A | 6/1989 | Sampson et al. |
| 4,872,736 | A | 10/1989 | Myers et al. |
| 5,037,175 | A | 8/1991 | Weber |
| D323,143 | S | 1/1992 | Ohkura et al. |
| 5,212,752 | A | 5/1993 | Stephenson et al. |
| 5,317,663 | A | 5/1994 | Beard et al. |
| 5,348,487 | A | 9/1994 | Marazzi et al. |

(Continued)

FOREIGN PATENT DOCUMENTS

| | | |
|---|---|---|
| CA | 2495693 A1 | 4/2004 |
| CN | 2836038 Y | 11/2006 |

(Continued)

OTHER PUBLICATIONS

European Search Report and Written Opinion dated Mar. 3, 2015 for EP 14187661.

(Continued)

*Primary Examiner* — Ryan Lepisto
*Assistant Examiner* — Guy Anderson
(74) *Attorney, Agent, or Firm* — Pepper Hamilton LLP

(57) ABSTRACT

Multi-fiber ferrules may be produced with tapered bodies and guide pin holes that have fluted internal surfaces with projections for engaging the guide pins, and channels for capturing any foreign material that may accumulate on or around the guide pins, thereby providing improved consistency in fiber connections during mating of the ferrules.

20 Claims, 10 Drawing Sheets

(56) References Cited

U.S. PATENT DOCUMENTS

| | | |
|---|---|---|
| 5,444,806 A | 8/1995 | deMarchi et al. |
| 5,481,634 A | 1/1996 | Anderson et al. |
| 5,506,922 A | 4/1996 | Grois et al. |
| 5,542,015 A * | 7/1996 | Hultermans ............ 385/60 |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,710,851 A | 1/1998 | Walter et al. |
| 5,764,834 A * | 6/1998 | Hultermans ............ 385/60 |
| 5,781,681 A | 7/1998 | Manning |
| 5,867,620 A * | 2/1999 | Bunin et al. ............ 385/53 |
| 5,890,926 A | 4/1999 | Pauza et al. |
| 5,923,803 A * | 7/1999 | Bunin et al. ............ 385/80 |
| 5,937,130 A | 8/1999 | Amberg et al. |
| 5,956,444 A | 9/1999 | Duda et al. |
| 5,971,626 A | 10/1999 | Knodell et al. |
| 6,007,257 A * | 12/1999 | Ogawa ............ G02B 6/3834 385/78 |
| 6,041,155 A | 3/2000 | Anderson et al. |
| 6,049,040 A | 4/2000 | Biles et al. |
| 6,085,003 A * | 7/2000 | Knight ............ G02B 6/3869 385/59 |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,390,687 B1 | 5/2002 | Shirakawa |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 | 3/2005 | Baus et al. |
| 6,885,805 B2 | 4/2005 | Asada |
| 6,935,789 B2 * | 8/2005 | Gross et al. ............ 385/78 |
| 7,090,406 B2 | 8/2006 | Melton et al. |
| 7,090,407 B2 | 8/2006 | Melton et al. |
| 7,091,421 B2 | 8/2006 | Kukita et al. |
| 7,093,983 B2 * | 8/2006 | Taira et al. ............ 385/78 |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmell et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,651,749 B2 | 2/2014 | Dainese Junior et al. |
| 8,727,634 B2 * | 5/2014 | Sasaki et al. ............ 385/59 |
| 2002/0079697 A1 | 6/2002 | Griffioen et al. |
| 2003/0053787 A1 | 3/2003 | Lee |
| 2003/0068135 A1 * | 4/2003 | Watanabe et al. ............ 385/53 |
| 2004/0052473 A1 | 3/2004 | Seo et al. |
| 2004/0120656 A1 | 6/2004 | Banas et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |
| 2005/0196106 A1 * | 9/2005 | Taira et al. ............ 385/78 |
| 2006/0089049 A1 | 4/2006 | Sedor |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | Lin et al. |
| 2009/0022457 A1 | 1/2009 | De Jong et al. |
| 2009/0028507 A1 | 1/2009 | Jones et al. |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2010/0014815 A1 * | 1/2010 | Ohmura et al. ............ 385/83 |
| 2010/0034502 A1 | 2/2010 | Lu et al. |
| 2010/0092136 A1 | 4/2010 | Nhep |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0141071 A1 * | 6/2012 | Duis et al. ............ 385/72 |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2012/0328244 A1 * | 12/2012 | Sasaki et al. ............ 385/59 |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121645 A1 * | 5/2013 | Haley et al. ............ 385/77 |
| 2013/0121653 A1 | 5/2013 | Shitama et al. |
| 2013/0183012 A1 | 7/2013 | Cabanne Lopez et al. |
| 2014/0023322 A1 | 1/2014 | Gniadek et al. |
| 2014/0050446 A1 | 2/2014 | Chang |
| 2014/0133808 A1 | 5/2014 | Hill et al. |
| 2014/0169743 A1 * | 6/2014 | Hodge et al. ............ 385/54 |
| 2014/0241671 A1 * | 8/2014 | Koreeda et al. ............ 385/78 |

(56) References Cited

U.S. PATENT DOCUMENTS

| | | | |
|---|---|---|---|
| 2014/0334780 A1 | 11/2014 | Nguyen et al. | |
| 2014/0348477 A1 | 11/2014 | Chang | |
| 2015/0104135 A1* | 4/2015 | Bushnell | G02B 6/3853 385/79 |

FOREIGN PATENT DOCUMENTS

| | | |
|---|---|---|
| CN | 201383588 Y | 1/2010 |
| CN | 2026500189 U | 12/2013 |
| DE | 202006011910 U1 | 3/2007 |
| DE | 102006019335 A1 | 10/2007 |
| DE | 102013102886 A1 | 9/2014 |
| EP | 1072915 A2 | 1/2001 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009/229545 A | 10/2009 |
| JP | 2009/276493 A | 11/2009 |
| TW | 200821653 A | 5/2008 |
| WO | WO 01/79904 A2 | 10/2001 |
| WO | WO 2004/027485 A1 | 4/2004 |
| WO | WO 2008/112986 A1 | 9/2008 |
| WO | WO 2009/135787 A1 | 11/2009 |
| WO | WO 2010/024851 A2 | 3/2010 |
| WO | WO 2012/136702 A1 | 10/2012 |
| WO | WO 2012/162385 A1 | 11/2012 |
| WO | WO 2013/052070 A1 | 4/2013 |
| WO | WO 2014/028527 A2 | 2/2014 |
| WO | WO 2014/182351 A1 | 11/2014 |

OTHER PUBLICATIONS

European Search Report and Written Opinion dated Feb. 19, 2015 for EP 14168005.

"Fiber Optic Connectors and Assemblies Catalog" 2009, Huber & Suhner Fiber Optics, Herisau, Switzerland, www.google.co.in/url?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D48403DAA363AEB7E&ei=?

"Fiber Optic Interconnect Solutions, Tactical Fiber Optic Connectors, Cables and Termini" 2006, Glenair, Inc., Glendale, California, wvvw.mps-electronics.de/fileadmin/files/MPS-E/Produkte/Katalog/Glenair/KatalogGlenair-LWL1110.pdf.

"Fiber Optic Products Catalog" Nov. 2007, Tyco Electronics Corporation, Harrisburg, Pennsylvania, www.ampnetconnect.com/documents/Fiber%20Optics%20Catalog%201107.pdf.

International Search Report and Written Opinion dated Apr. 27, 2012 for PCT/US2011/058799.

International Search Report and Written Opinion dated Aug. 27, 2012 for PCT/US2012/039126.

International Search Report and Written Opinion dated Jan. 16, 2014 for PCT/US2013/54784.

International Search Report and Written Opinion dated Aug. 29, 2014 for PCT/US2014/041500.

International Search Report and Written Opinion dated May 14, 2014 for PCT/US2014/012137.

International Search Report and Written Opinion dated Aug. 21, 2008 for PCT/US2008/057023.

* cited by examiner

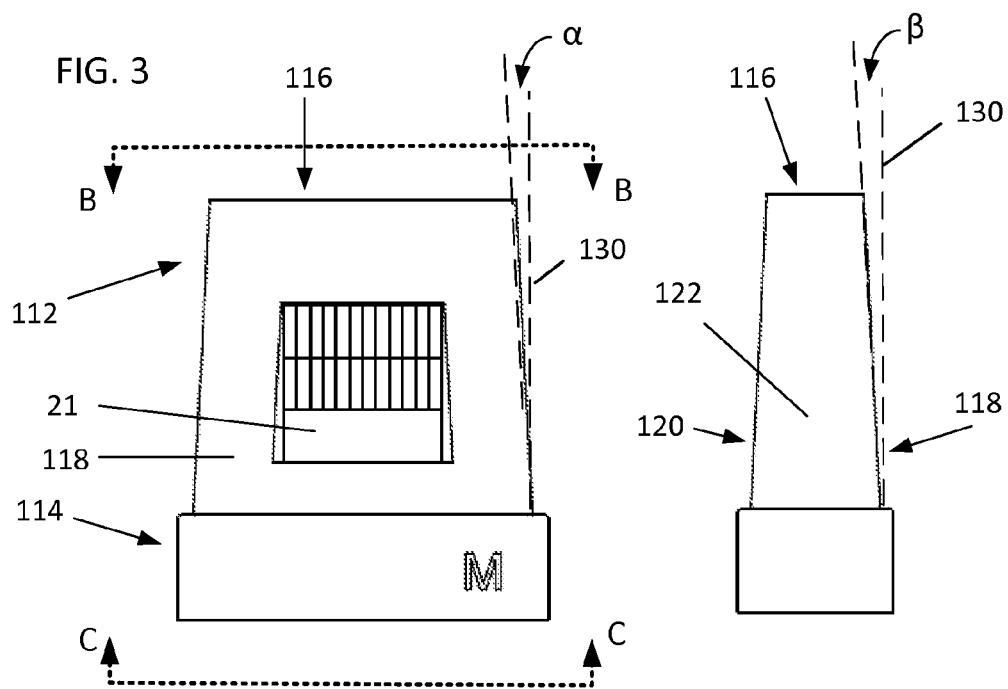
FIG. 3
FIG. 3A
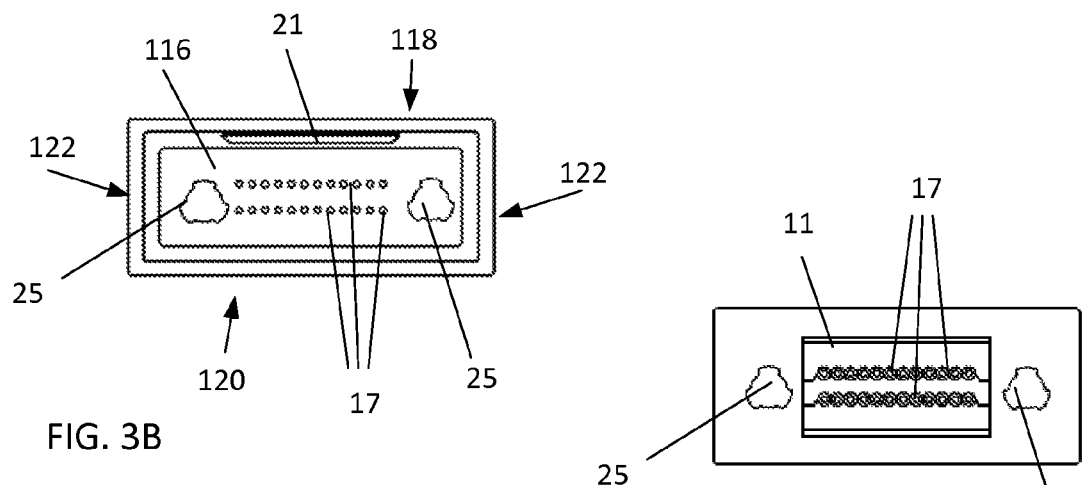
FIG. 3B
FIG. 3C

FIG. 4
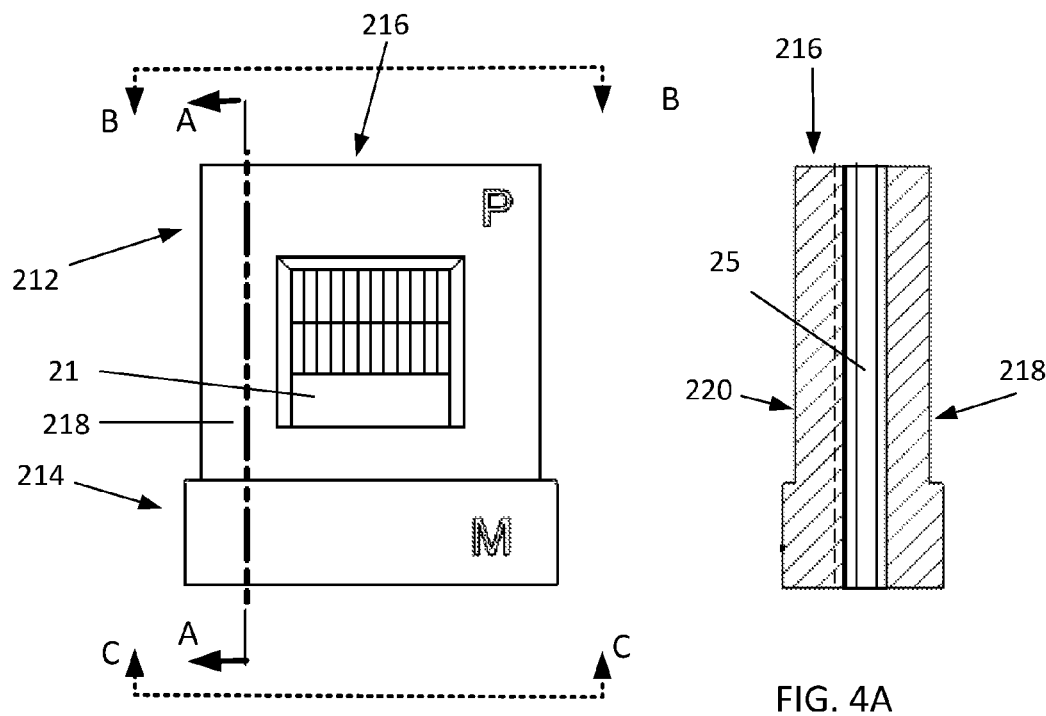
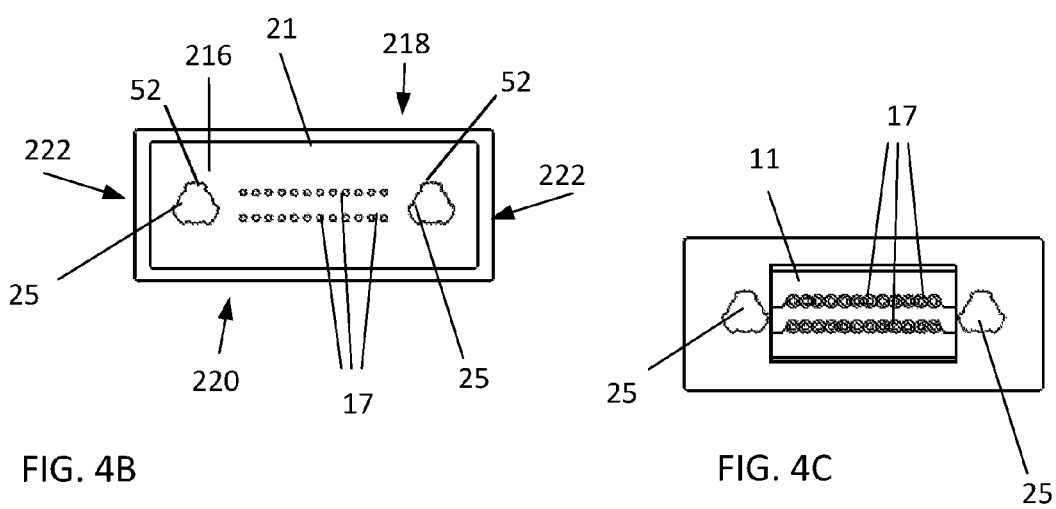
FIG. 4B
FIG. 4C

OPTICAL FIBER CONNECTOR AND FERRULE

BACKGROUND

Optical ferrules which are standardized according to JIS C 5981, IEC 61754-5 and the like, are called MT (Mechanically Transferable) ferrules, and are used for connecting optical fibers. MT ferrules generally use at least two guide pins for high-accuracy positioning of each optical fiber in the ferrule. An MT ferrule body may include two guide pin holes on the end surface of the ferrule for receiving the guide pins therein, and may have a plurality of optical fiber holes for receiving the optical fibers. The respective optical fibers may be inserted into the optical fiber insertion holes from a rear end of the MT ferrule, and may be fixed in place with adhesive.

An adapter may be used for face-to face joining of two MT ferrules. MT ferrules generally have a rectangular cross-sectional shape, and likewise, the adapter may be in the shape of a rectangular cylinder for insertion of one ferrule into each end. Two MT ferrules, one with guide pins installed (male connector) and one without guide pins (female connector) are inserted into opposite ends of the adapter whereby the ferrules are aligned together with one another as the male guide pins enter the female guide pin holes. One type of connector that uses MT ferrules is an MPO (multi-fiber push-on) connector The MT ferrules get pushed together within the adapter to optically connect the ferrules by means of a so-called PC (Physical Contact) connection, wherein the optical fibers in one ferrule contact the optical fibers in the other ferrule and get compressed together to provide an optical connection. Optical transmission performance between the optical fibers is strongly dependent on connecting conditions such as axis alignment and inclination of the optical fibers, and gaps between the opposing optical fibers.

To prevent gaps during connection, it is necessary to remove foreign materials that may be adhered to the connection end face of the MT ferrule. Any foreign materials are commonly wiped off by use of a cleaner. However, connection loss at the PC connection may be increased during wiping off, because some of the foreign materials may be gathered and deposited around base portions of the guide pins. In general, any foreign materials that may be present on the end face or components of the end face may interfere with the connection by causing the faces to be spaced apart from one another, resulting in gaps between the optical fibers.

In addition, in installations wherein the adapter is fixedly mounted in a panel, for example, the angular orientation of the ferrule as it is retrieved, aligned, and inserted may stress the optical fibers, and possibly result in breakage of a fiber or fibers if considerable care is not taken when the ferrule is inserted into the adapter.

Therefore, during the mating of MT ferrules, there remains a need for minimization of issues that may result in poor fiber mating connections, such as contamination on the end faces of the MT/MPO ferrules, and the possibility of fibers breaking when the MPO connector is inserted into an MPO adapter in a rough or incorrect manner.

SUMMARY

Modifications of the MT ferrules may provide for better fiber connections during mating of the ferrules. To reduce the accumulation of contaminants on or between faces of mating ferrules, channels may be provided within the guide pin holes for debris accumulation. In addition, to reduce the possibility of breaking fibers while inserting a ferrule into an adapter, the ferrule body may be provided with a tapered design to allow for some initial play and leeway during the initial stage of the insertion into the adapter.

In an embodiment an optical fiber connector is disclosed. The connector is configured for being coupled with an adapter to mate with another optical fiber connector, and the connector includes a housing having a first end for being coupled with the adapter, and a ferrule floatably mounted in the housing. The housing defines a first longitudinal passage therethrough, with the first longitudinal passage defining a first longitudinal axis. The ferrule is floatably mounted at the first housing end within the first longitudinal passage for relative movement between the ferrule and the housing, and the ferrule includes a first end protruding forward of the first housing end, and a second end spaced from the first end and disposed within the first longitudinal passage, the ferrule defining a second longitudinal axis extending from the first end to the second end, and the first end includes an end face for mating with an end face of an additional ferrule. The ferrule includes at least first and second alignment pin holes in the end face configured for receiving an alignment pin therein, wherein each of the first and second alignment pin holes have a longitudinal direction parallel with the second longitudinal axis, and each pin hole defines an interior surface comprising a plurality of spaced apart longitudinal grooves extending from the end face and into the ferrule. The ferrule also includes at least one side wall having a first wall end at the end face and extending from the end face to a second wall end adjacent the second end of the ferrule, with the at least one side wall tapering outwardly away from the second longitudinal axis in a direction from the end face towards the second end so that the ferrule is tiltable within the housing passage to offset the second longitudinal axis with respect to the first longitudinal axis.

In an embodiment, an optical ferrule includes a housing that includes a first end, a second end spaced from the first end, and a longitudinal axis extending from the first end to the second end, wherein the first end comprises an end face for mating with an end face of an additional optical ferrule. The housing also includes at least one passage extending through the housing and configured for receiving at least one optical fiber therein for termination of the at least one optical fiber at the end face, and at least one side wall extending from the end face towards the second end, the at least one side wall tapering outwardly away from the longitudinal axis in a direction from the second end to the first end.

In an embodiment, an optical ferrule includes a housing that includes a first end, a second end spaced from the first end, and a longitudinal axis extending from the first end to the second end, wherein the first end comprises an end face for mating with an end face of an additional optical ferrule. The housing also includes at least one passage extending through the housing and configured for receiving at least one optical fiber therein for termination of the at least one optical fiber at the end face, and at least first and second alignment pin holes in the end face configured for receiving an alignment pin therein, each of the first and second alignment pin holes having a longitudinal direction parallel with the longitudinal axis, and defining an interior surface comprising a plurality of spaced apart longitudinal grooves extending from the end face and into the housing.

BRIEF DESCRIPTION OF THE FIGURES

FIGS. 3, 3A, 3B and 3C depict various views of the ferrule of FIGS. 1A and 1B according to an embodiment.

FIGS. 4, 4A, 4B and 4C depict various views of the ferrule of FIGS. 2A and 2B according to an embodiment.

DETAILED DESCRIPTION

Figure 1A:
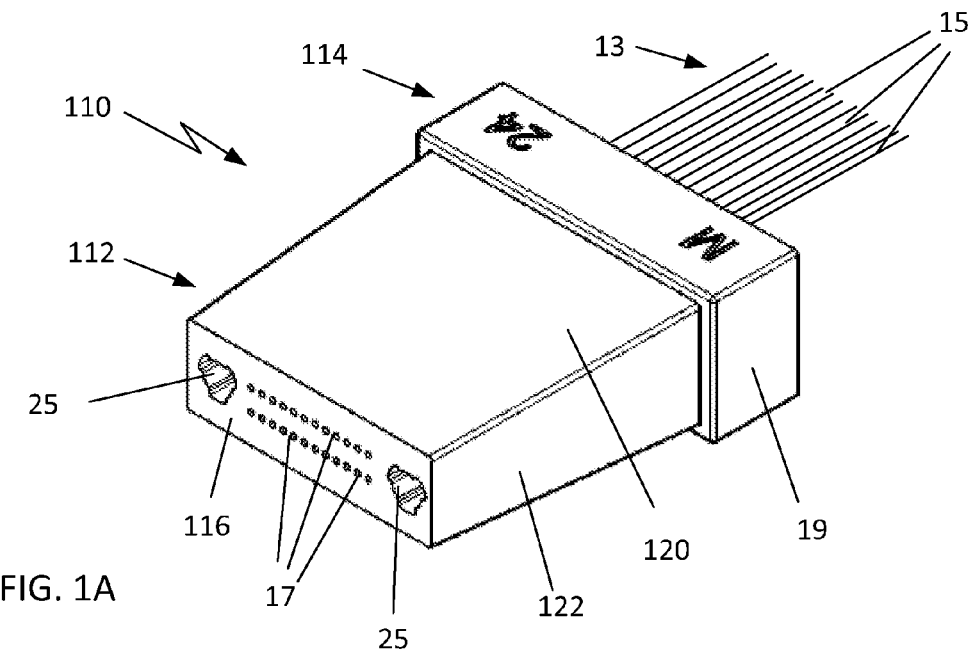
FIGS. 1A and 1B depict a tapered ferrule body with modified guide pin holes according to an embodiment.
Figure 1B:
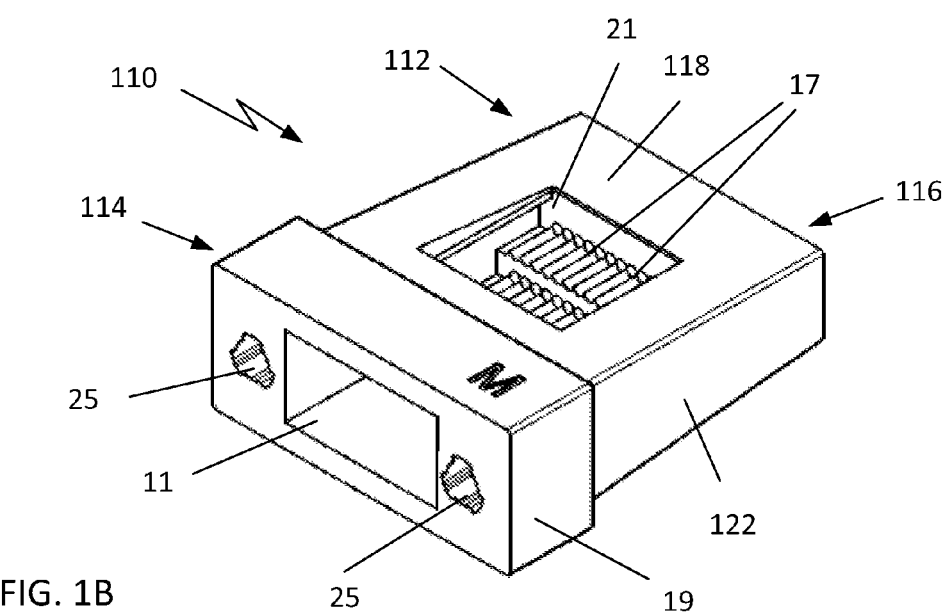
Figure 2A:
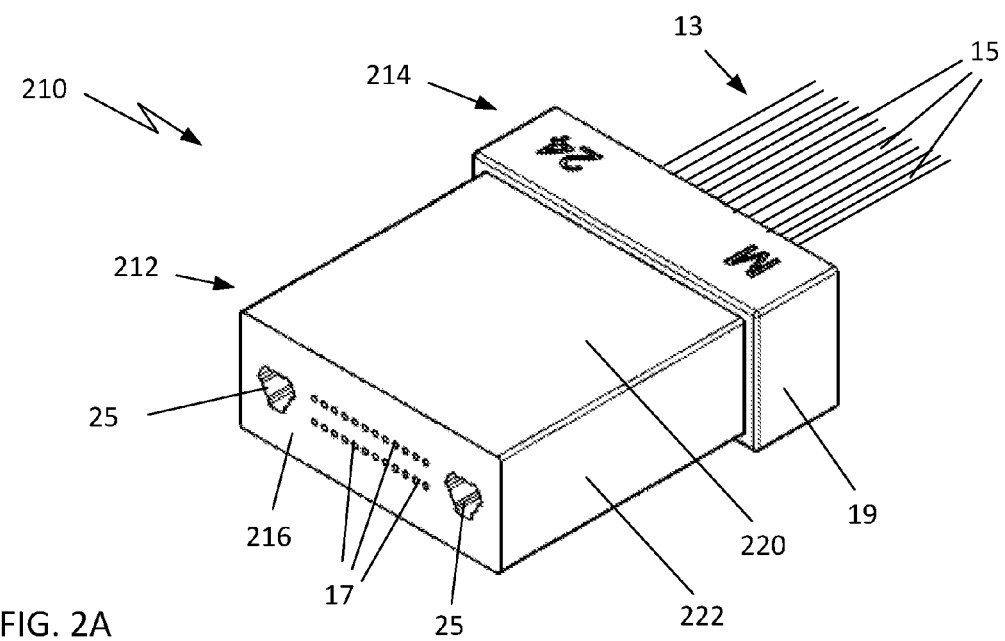
FIGS. 2A and 2B depict a non-tapered ferrule body with modified guide pin holes according to an embodiment.
Figure 2B:
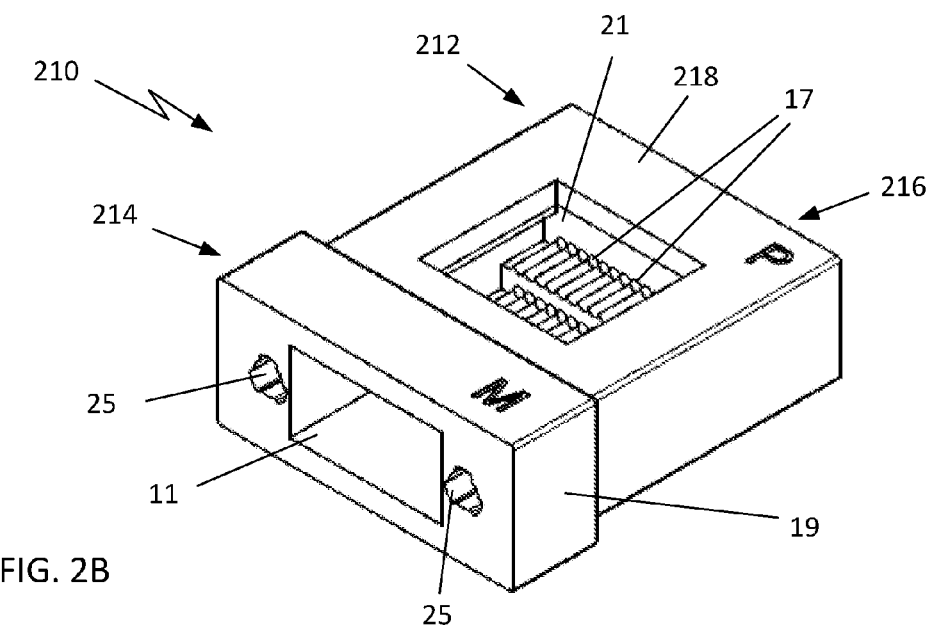

While the following description is directed towards MT optical ferrules, the embodiments described may be applicable to other ferrule types as well. As represented in the embodiments of FIGS. 1A, 1B, 2A and 2B, a ferrule may have a main body 110 or 210 that defines a front, insertion end 112 or 212, that may be inserted into an adaptor 9 (shown in outline in FIG. 5), as well as a rear end 114 or 214. The rear end may typically be engaged in or with a fiber optic connector housing (not shown). In an embodiment as represented in FIGS. 1A and 1B, the ferrule body 110 may be a tapered-body, as shown in greater detail in FIGS. 3, 3A, 3B and 3C, and may have a frusto-pyramidal shape, or define a rectangular frustum. In an alternative embodiment, as represented in FIGS. 2A and 2B, the ferrule body 210 may be cuboid with essentially parallel opposing faces, as shown in greater detail in FIGS. 4, 4A, 4B and 4C.

The rear end 114 or 214 may include an opening 11 configured for receiving an end of a multi-fiber optical cable 13, that may be, for example, a ribbon cable of a plurality of individual optical fibers 15. The front end 112 or 212 may have a connection end face 116 or 216 that may include a plurality of optical fiber insertion holes 17 arranged in at least one row, or as shown, two rows. Individual ones of the optical fibers 15 of the multi-fiber cable 13 may be disposed in the holes 17 to terminate at the connection end face 116, 216.

In an embodiment, the front end 112, 212 of the ferrule body 110, 210 may be formed to have a rectangular cross-sectional shape. The rear end 114, 214 of the ferrule main body 110, 210 may be provided with a flange 19. The optical fibers 15 may be inserted, via the opening 11, through the flange 19, and into the optical fiber insertion holes 17. A top face 118, 218 of the insertion end 112, 212 may include an access opening 21 for guiding the optical fibers 15 into the holes 17. The optical fibers 15 may be fixed in place by use of an adhesive that may be injected into the ferrule body 110, 210 via the access opening 21 and/or the cable opening 11.

Figure 5:
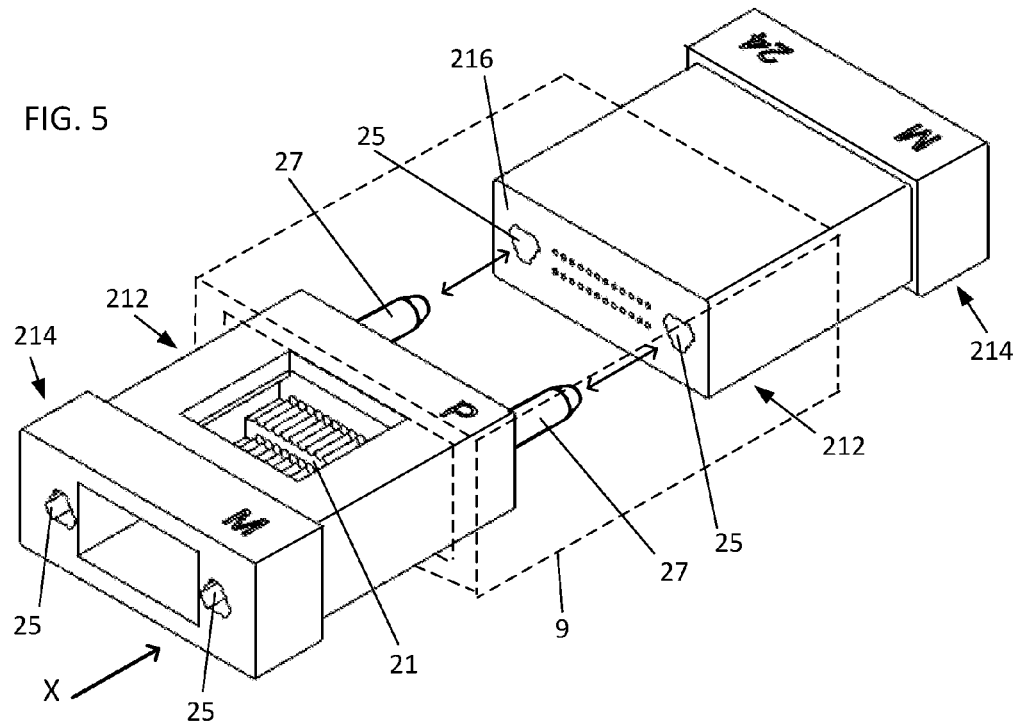
FIG. 5 provides a representative illustration of the mating of two ferrules having non-tapered bodies according to an embodiment.
Figure 6:
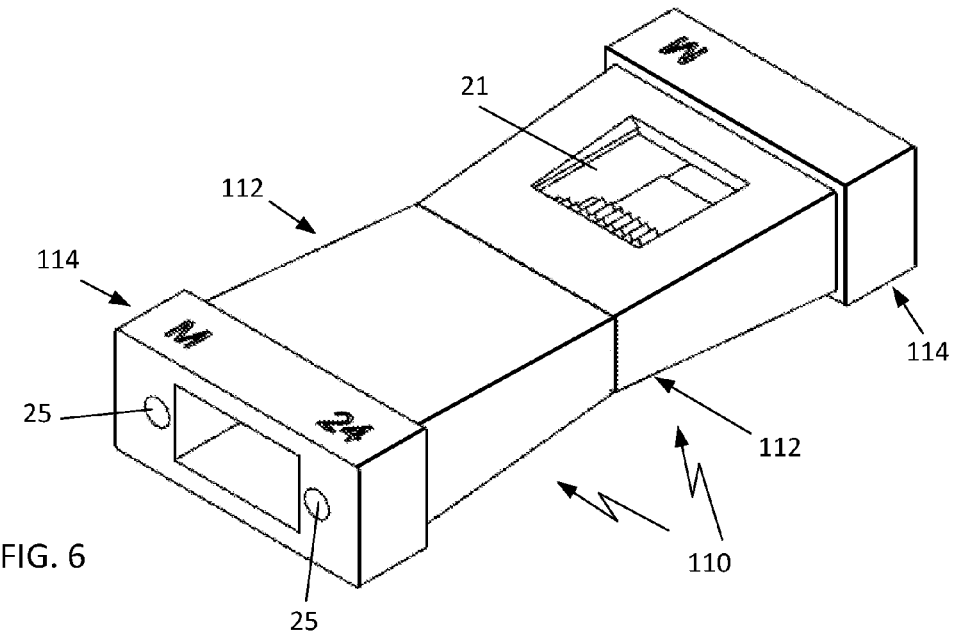
FIG. 6 provides a mated depiction of two tapered body ferrules according to an embodiment.

Guide pin insertion holes 25, described in greater detail below, may be provided through the body 110, 210, extending from the connection end face 116, 216 out through the rear end 114, 214. In an alternative embodiment, guide pin insertion holes 25 may be configured only at the front ends 112, 212. Guide pins, such as guide pins 27 shown in FIG. 5, may be inserted into the guide pin holes 25 for precise alignment of a pair of ferrules as shown in FIGS. 5 and 6.

FIG. 3 shows a top plan view of the tapered-body ferrule 110, and FIG. 3A shows a side view. In an embodiment, a ferrule 110 may have at least one side wall having a first wall end at the connection face 116 and extending from the connection face to a second wall end adjacent the rear end 114 of the ferrule. The at least one side wall may taper outwardly away from a longitudinal axis of the ferrule in a direction from the connection face 116 towards the rear end 114.

In an embodiment, the at least one side wall may include a top face 118, bottom face 120, and side faces 122, and the faces may each taper outwardly in a direction from the connection face 116 towards the rear end 114. The use of 'top', 'bottom' and 'side' are provided for reference only and are relative to the figures, wherein the figures could have essentially been drawn with any orientation showing any of the faces 118, 120 or 122 as the 'top' for example. As depicted, faces 118 and 120 are opposite one another, and faces 122 are opposite one another and orthogonal to faces 118 and 120.

The flange 19 extends laterally away from the top face 118, bottom face 120, and side faces 122. A reference line 130 orthogonal to the flange 19 is also shown. In an embodiment, as shown, the side faces 122 may be disposed at an angle α from the orthogonal, and the top face 118 and bottom face 120 may be disposed at an angle β. In an embodiment, the angles α and β may be the same. In various embodiments, the angles α and β may have a value of about 1°, about 1.5°, about 2°, about 2.5°, about 3°, about 3.5°, about 4°, about 4.5°, and about 5°, and any value between any of the listed values. In an embodiment as represented by FIGS. 3 and 3A, the angles α and β may be about 3°. The amount of angular taper may be limited essentially only by design. For example, it may be desirable for the tapered sides to remain external to the guide pin holes 25.

In alternative embodiments, the angles α and β may be different from one another, or in further embodiments, each of the side faces 122 may be disposed at different angles α, and the top face 118 and bottom face 120 may be disposed at different angles β. Due to the angular taper, the cross-sectional area of the ferrule body at the connection face 116 is less than a second cross-sectional area adjacent the flange 19, and the flange has a third cross-sectional area that is greater than the second cross-sectional area.

FIGS. 7A, 7B, 8A, and 8B, provide a representation of a panel structure 300 with mated ferrules 110a, 110b. Each of the ferrules 110a, 110b may be a component of an optical fiber connector assembly 302a, 302b with some parts represented schematically. An adaptor 9, as also represented in FIG. 5, may be mounted with the panel 300 and may be configured for receiving the connector assemblies 302a, 302b, via opposing openings 9a and 9b, into a longitudinal passage 9c. The adaptor 9 may define a first longitudinal axis 9d.

Each of the connector assemblies 302a, 302b may include a housing 304 that define an internal passage 305, and a second longitudinal axis 305d. The first longitudinal axis 9d and the second longitudinal axis 305d may generally be parallel when no external lateral forces are applied to a connector assembly 302a, 302b. The ferrules 110a, 110b may be configured so that the front ends 112a, 112b extend out of connector assemblies 302a, 302b for mating of the connection end faces. Guide pins 27 may be provided as components of a pin block 308 that may be inserted through guide pin holes 25 through the back end 114 of a ferrule body to extend forwardly of the connection end face 116 to enter into guide pin holes 25 of the opposing mating ferrule body.

A biasing force for maintaining the ferrule 110a, 110b in engagement with one another may be provided by a biasing member, such as a spring 310 and spring retainer 312. The spring 310 may be compressed between the pin block 308 and the spring retainer 312 to bias the pin block away from the retainer and forwardly through the connector housing 304 for engagement with the opposing ferrule. The ferrules 110a, 110b may be retained within the connector housings 304 by configuring the flange 19 to have a dimension that is greater than an internal dimension defined between the shoulders 320. The flange 19 may be biased into engagement with the shoulder 320. Similarly, the housing 304 may be retained within the adaptor 9 by providing an engagement projection 322 on the exterior of the housing and an engagement shoulder 324 internally within the adaptor so that the engagement projections define an external dimension that is greater than an internal dimension defined between the engagement shoulders 324.

With an embodiment as shown and described, the tapered body ferrules 110a, 110b, are configured as 'floating' ferrules and may be floatably mounted within their respective housings 304, wherein the ferrule and housing are movable relative to one another, so that the ferrule may tilt through a conical range of movement within the housing. In an embodiment as illustrated in FIG. 7B, housing 304 may be displaced laterally relative to the ferrule 110b so that the longitudinal axis 305d moves through an angle of about $\theta_1$ with respect to the longitudinal axis 9d. In an embodiment, the angle $\theta_1$ may be an amount approximately the same as the previously described angle α.

Application of a lateral force F, for example, may therefore cause the housing 304 to mover relative to the mated ferrules, thereby reducing possible breakage of a connector 302a, 302b, and allowing for the mated connection surfaces to remain aligned and mated within the adaptor 9. In an embodiment, a stop 330 may be provided to prohibit movement beyond the maximum displacement angle $\theta_1$, thereby reducing potential damage to a ferrule. A multifiber connector 302 may be designed such that the clearances between the inner sidewalls 305 of the connector housing 304 and the tapered ferrule sides are increased in a manner which maintains the alignment of the ferrule relative to the connector housing, while at the same time permitting the ferrule to freely float within the connector housing as lateral forces are applied to the multifiber connector, thereby maintaining low optical attenuation as lateral forces are applied. In particular, it has been determined that the clearance between the inner sidewalls of the connector housing and the forward end of the ferrule are particularly critical to the freedom with which a ferrule floats within the connector housing as the multifiber connector is subjected to lateral forces. In an additional embodiment, not shown, the side walls 305 may also taper outwardly from the shoulder 320 towards the front end 306 to provide additional relative angular movement between the housing 304 and the ferrule 110.

Figure 7A:
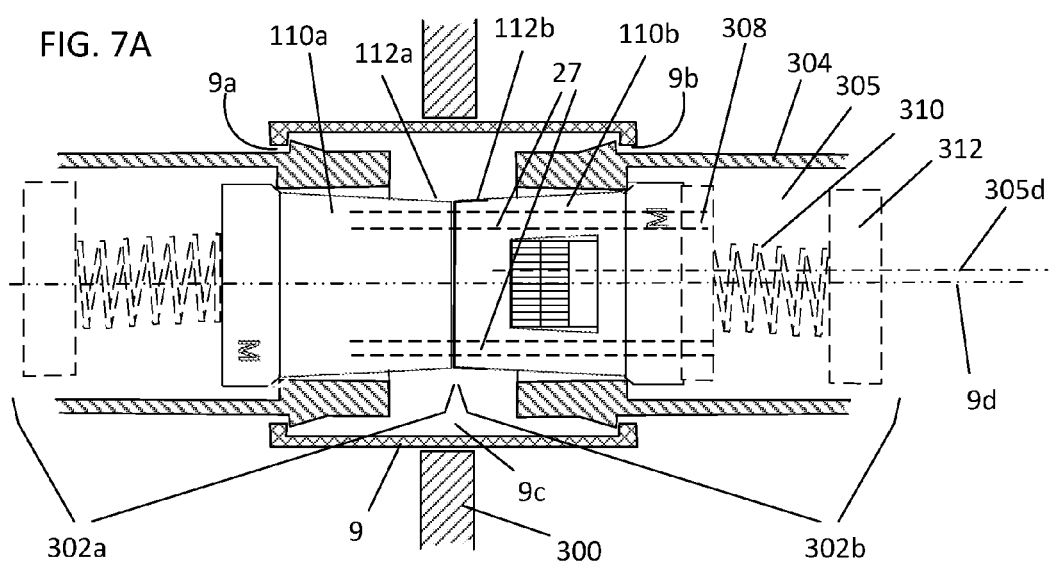
FIGS. 7A and 7B provide a top view of a mated connection of tapered-body ferrules according to an embodiment.
Figure 7B:
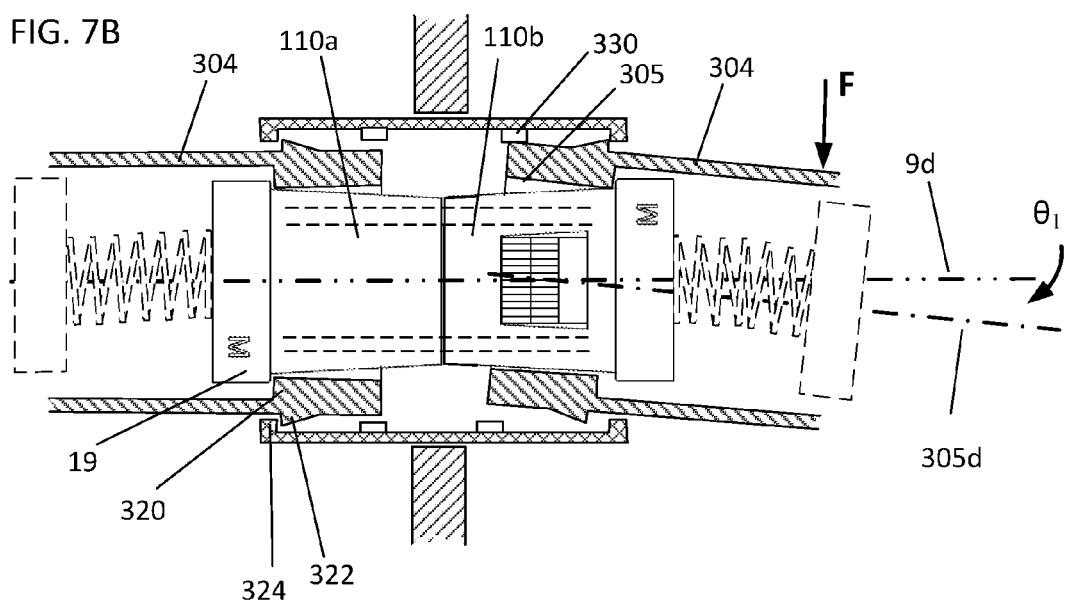
Figure 8A:
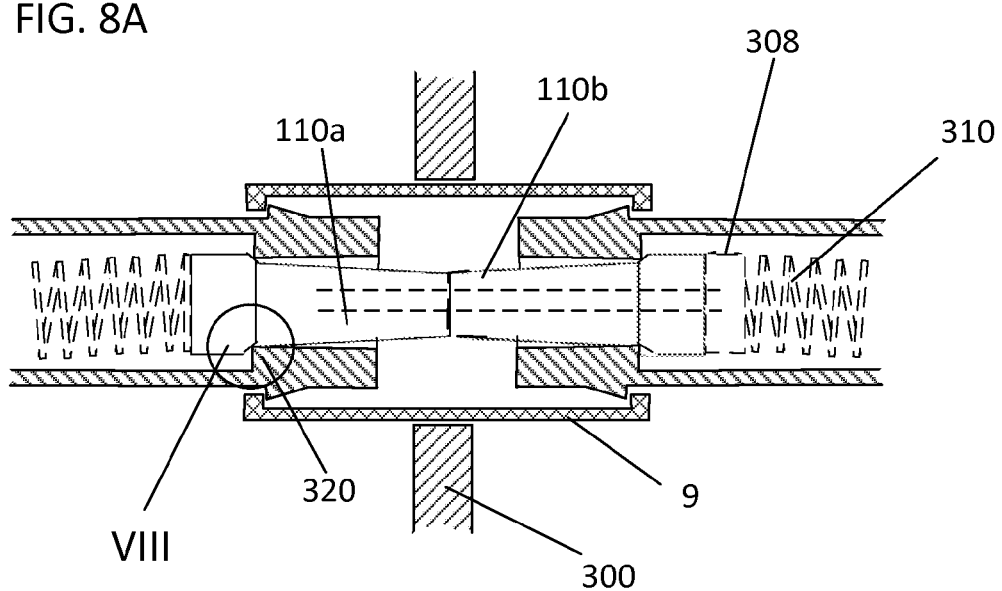
FIGS. 8A and 8B provide a side view of a mated connection of tapered-body ferrules according to an embodiment.
Figure 8B:
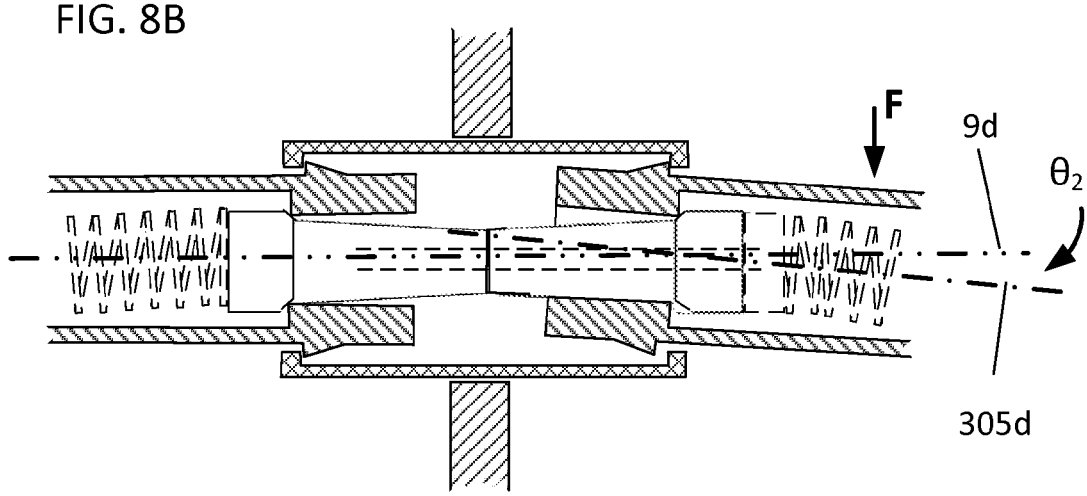

FIGS. 8A and 8B provide a similar depiction to the illustrations of FIGS. 7A and 7B except from a side view of the mated ferrules 110a, 110b. In a similar manner as discussed, the connector housing 304 may move up and down relative to the ferrule through an angle $\theta_2$. In an embodiment, the angle $\theta_2$ may be an amount approximately the same as the previously described angle β.

Figure 8C:
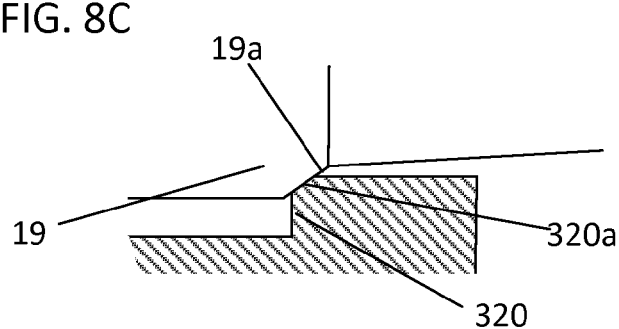
FIG. 8C provides a representative illustration of engagement surfaces of a flange and housing shoulder according to an embodiment.

As represented in FIG. 8C, in an alternative embodiment of the engagement surfaces of flange 19 and shoulder 320, one or both of the surfaces 19a of the flange and surface 320a of the housing shoulder, may be angled. As such, under the bias applied by the spring 310 the ferrule 110 may self-center within the internal passage of the housing. For comparison, FIG. 7B depicts an embodiment having squared shoulders for the engagement surfaces of flange 19 and shoulder 320, and FIG. 8B depicts an embodiment having an angled surface for the engagement surfaces of flange 19 and a squared shoulder 320.

Figure 9A:
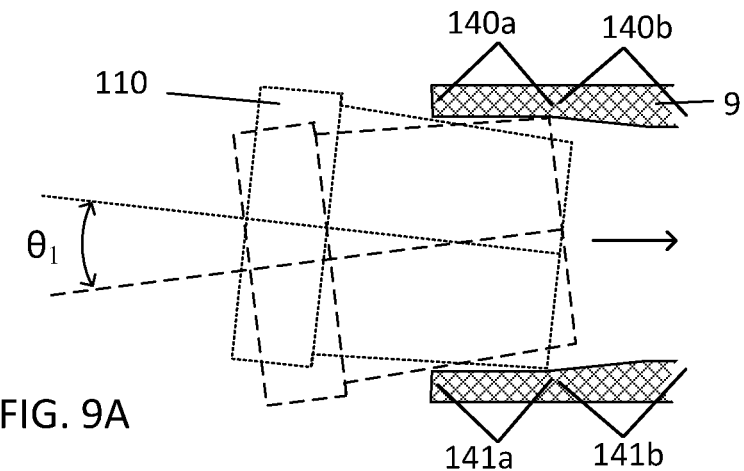
FIGS. 9A and 9B provide a top view of a representative illustration of the angular insertion variability provided by a tapered ferrule body according to an embodiment.
Figure 10A:
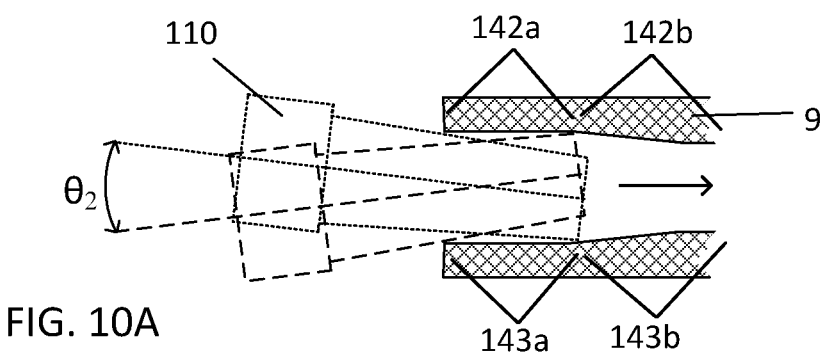
FIGS. 10A and 10B provide a side view of a representative illustration of the angular insertion variability provided by a tapered ferrule body according to an embodiment.
Figure 11A:
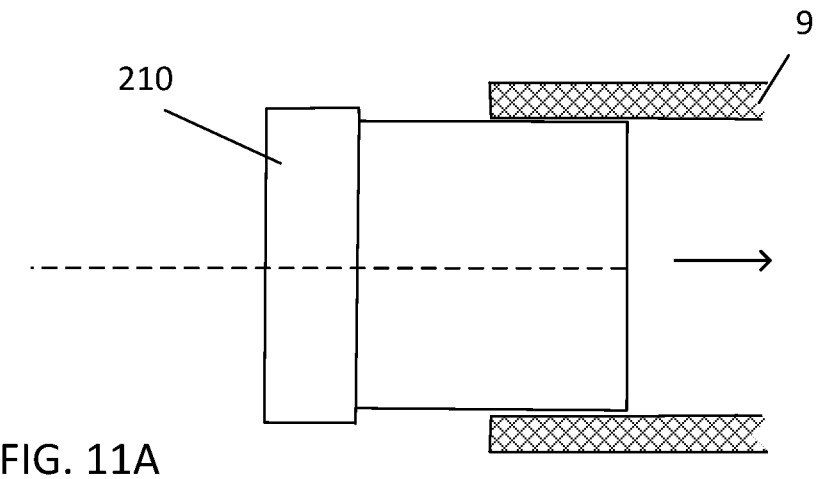
FIGS. 11A and 11B provide a comparative illustration of the insertion rigidity provided by a non-tapered ferrule body.
Figure 11B:
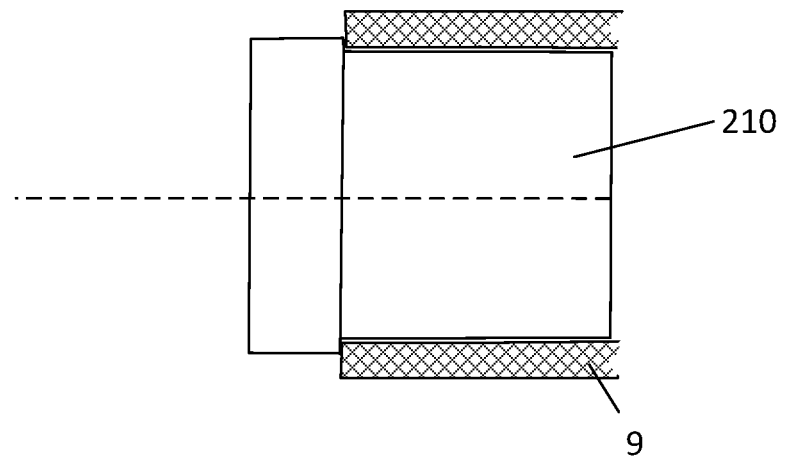

In an alternative embodiment, as represented in FIGS. 9A and 10A, by providing the body 110 with tapered faces, a degree of angular freedom may be provided during insertion of the ferrule into an adaptor 9. FIG. 9A shows a representative top/bottom view of a ferrule body 110 after a partial insertion into an adaptor 9, while FIG. 10A shows a representative side view. The representations of FIGS. 9A and 10A are provided as examples only, to illustrate an approximation of the angular leeway during an insertion, and other variants and configurations may also be provided. In comparison, FIG. 11 depicts the insertion of the ferrule body 210 (rectangular-cuboid or non-tapered, insertion end) into an adaptor 9.

Prior to insertion of a ferrule into an adaptor, with no obstacles near the opening of the adaptor, there might be essentially angular freedom of movement within approximately hemispherical confines as the ferrule is brought into the vicinity of the adaptor. However, as shown in FIG. 11, after a partial insertion of the cuboid housing 210 into the adaptor 9, there is essentially no remaining angular freedom of movement for the ferrule body within the adaptor, thus requiring there to be essentially completely unrestricted access directly in front of the adaptor 9 for a straight-in insertion. If a forced bending is required during insertion, strain may be applied to the other components of an MPO connector containing the MT ferrule, and damage, or a reduction in the quality of the connection, may result. For example, the MPO fibers may break if the MPO connector is forcibly bent for insertion into the adaptor 9.

Figure 9B:
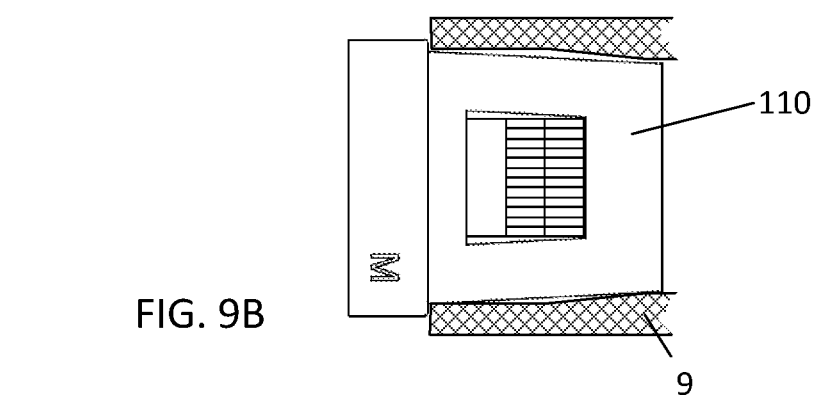
Figure 10B:
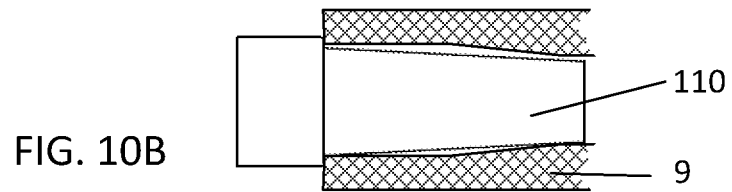

As shown in FIGS. 9A and 10A, however, if the insertion end 112 is tapered, the ferrule may still be movable side-to-side (FIG. 9A) within an angular displacement of about $\theta_1$ and may still also movable up-and-down (FIG. 9B) within an angular displacement of about $\theta_2$. The values for $\theta_1$ and $\theta_2$ may be the same, or may be different. The extent of $\theta_1$ and $\theta_2$ may vary based on the taper angle of the sides, as well as the internal configuration within the opening of the adaptor 9. For example, in an embodiment as shown in FIGS. 9A and 10A, portion 140a and 141a, and portions 142a and 143a of the internal guide walls adjacent the opening may be parallel to provide a larger internal cavity adjacent the opening at least for about one-half of the insertion length. The remaining portion of the guide walls 140b and 141b, and portions 142b and 143b may be tapered to provide alignment of the ferrule body 110 into its final seated position (shown in FIGS. 9B and 10B). Other internal configurations may also be provided.

In an embodiment as depicted in FIG. 6, ferrule housings 110 with tapered bodies may include cylindrical guide pin holes 25. To provide for an improved face-to-face connection of connection surfaces 116, 216, (as shown for example in FIGS. 6 and 13C), the connection surfaces should be free of foreign material that may inhibit contact between the surfaces and the optical fibers terminated therein. One area in which an accumulation of foreign material may result is at the base of the guide pins 27 (see for example 60-1 in FIG. 13A). For example, the foreign material may accumulate here in the formed 'corner' when the connection surface is wiped. Also, In order to attain precise alignment of ferrules, very little tolerance is provided between the external diameter of the guide pins 27 and the internal diameter of the guide pin holes 25. As such, if any foreign debris is present on the guide pin 27 the debris may be pushed along the pin as the pin is inserted into the pin hole 25 so that the debris remains as an accumulation at the base of the pin on the surface 116, 216. This accumulation may prevent proper contact between adjoining contact surfaces and thereby result in a poor transmission between ferrules.

Figure 12A:
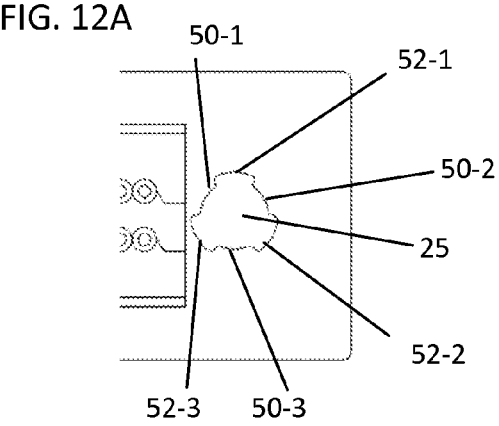
FIGS. 12A and 12B provide end views along line X of FIG. 5 of mated ferrule bodies according to an embodiment.

One manner in which to inhibit an accumulation of foreign material at the base of the pins 27 from being a hindrance to good surface contact between surfaces 116, or surfaces 216 may include providing a fluted internal surfaces within the pin holes 25, or providing a plurality of longitudinal grooves along the internal surface of the pin holes. In an embodiment as shown in FIGS. 3B, 3C, 4B and 4D, for example, and enlarged detail in FIG. 12, guide pin holes 25 may include at least three raised ridges 50-1, 50-2 and 50-3, offset circumferentially from one another at about 120°, and having a radially inward surface for contacting the guide pin 27. In addition, between the ridges 50-1, 50-2 and 50-3 there may be provided intervening grooves 52-1, 52-2 and 52-3, offset circumferentially from one another at about 120°. A cross-sectional view taken through a guide pin hole 25 is represented in FIG. 4A.

Figure 12B:
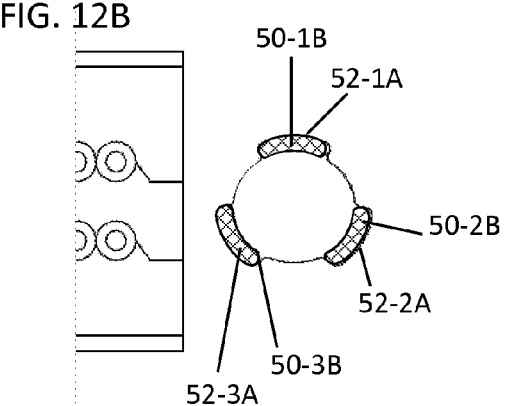

As represented in FIG. 5, and shown in detail in FIG. 12B, the configuration of ridges and grooves in one ferrule housing 210A may be arranged in opposition to the configuration of ridges and grooves in the abutting ferrule housing 210B so that the ridges of one housing align with the grooves of the other housing. This is represented by the end view shown in FIG. 12B, taken in a direction of arrow X in FIG. 5, wherein the ridges 50-1B, 50-2B and 50-3B of the housing 210B are visible at the ends of the grooves 52-1A, 52-2A and 52-3A of the housing 210A. The circumferential (angular) length of the ridges 50-1, 50-2 and 50-3 may be at most about 60°, and the circumferential (angular) length of the grooves 52-1, 52-2 and 52-3, may be at least about 60°. In an embodiment, the angular length of the grooves should be greater than the angular length of the ridges so that when mated the ridges of one ferrule do not overlap with the ridges of the mating ferrule at the edges of the ridges.

Since it may be common with some ferrules, as shown in FIG. 5, to connect ferrules by inverting one ferrule housing 210A of one cable connector in relation to the other ferrule housing 210B to which it is to be connected, a configuration of ridges and grooves, such as is illustrated in FIGS. 4B, 4C and 5 may provide for such an opposition alignment. Referring to FIG. 4B, for example, guide pin holes 25 may each have a groove 52 disposed upwardly, and therefore, when inverted, an additional housing will have the same groove disposed downwardly.

Figure 13A:
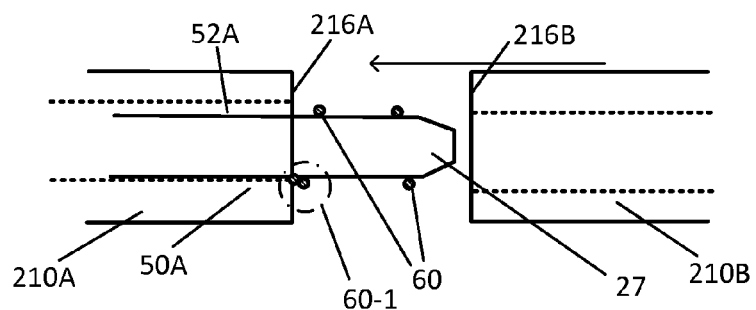
FIGS. 13A, 13B and 13C provide a detailed cross-sectional view of the mating of two ferrule bodies and the avoidance of contaminant blockage according to an embodiment.
Figure 13B:
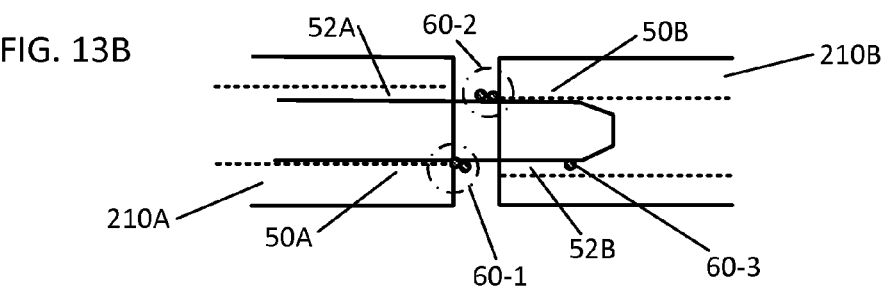
Figure 13C:
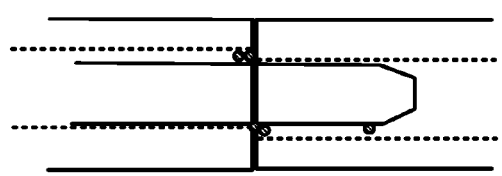

With such a fluted configuration of guide pin holes 25, any accumulated foreign material that occurs on the connection surface 216 at the base of a guide pin 27 will thereby end up, when adjoining an adjacent ferrule, in a groove 52 of the guide pin hole of the adjacent ferrule. This is represented in FIGS. 13A-13C, depicting a connection of ferrules by means of an alignment guide pin 27. In the depiction as shown, ferrule housing 210A has a groove 52A at the top and a ridge 50A at the bottom, while the inverted ferrule housing 210B has a ridge 50B at the top and a groove 52B at the bottom. Guide pin 27, previously inserted into housing 210A, as shown in FIG. 13A, has foreign material particles 60 on the surface, with an accumulation of particles 60-1 on the connection surface 216A at the base of the pin 27.

As represented in FIG. 13B, as the housing 210B is inserted onto the guide pin 27, the upper ridge 50B of the guide pin holes pushes the foreign material particles 60-2 along the guide pin in a direction to the left in the figure toward the opposite housing 210A, while any foreign material 60-3, on the bottom side remains in place within the lower groove 52B. When connection surfaces 216A and 216B abut, particles 60-2 are pushed into the opposing groove 52A, while the particles 60-1 likewise enter into an opposing groove 52B, thereby allowing for the surfaces 216A and 216B to cleanly abut one another, resulting in reduced insertion loss and return loss, and thereby resulting in reduced network failures.

Figure 14:
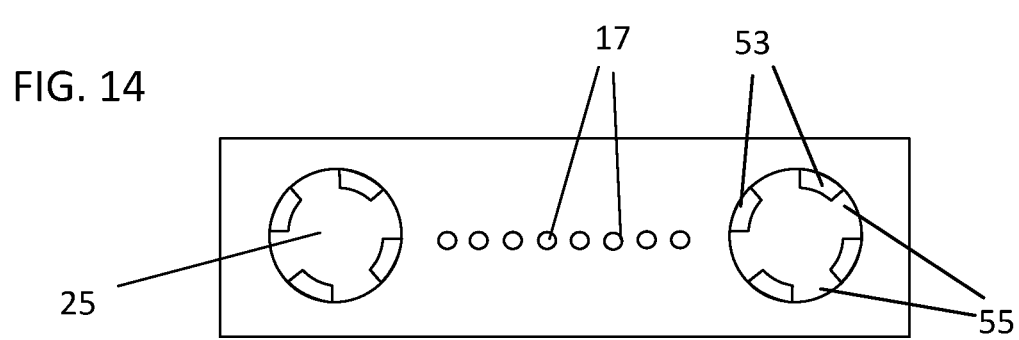
FIG. 14 depicts an alternative configuration for the guide pin holes according to an embodiment.

In alternative embodiments, the number and configuration of ridges and grooves may vary. For example, as shown in FIG. 14, an internal fluting within the guide pin holes 25 may include fours ridges 53 separated by four grooves 55, also configured so that when one housing is inverted for mating the ridges align with grooves of an opposing housing. Alternatively, there may be five ridges/five grooves, six ridges/six grooves, seven ridges/seven grooves or eight ridges/grooves, or any configuration of ridges and grooves that may be accommodated by the internal dimensions of the guide pin holes. In general, the pin holes 25 may have n longitudinal ridges separated by n longitudinal grooves. The n longitudinal ridges may be disposed equidistantly from one another on the interior surface and spaced at 360°/n from one another along the internal circumference of the pin hole, and each ridge may extend in a circumferential direction at most about 360°/2n along the internal circumference of the pin holes. Similarly, the n longitudinal grooves may be disposed equidistantly from one another on the interior surface and spaced at 360°/n from one another along the internal circumference of pin hole, and each groove may extend in a circumferential direction at least about 360°/2n along the internal circumference of the pin holes.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An optical fiber connector configured for being coupled with an adapter to mate with another optical fiber connector, the connector comprising:
   a housing comprising a first end for being coupled with the adapter, the housing defining a first longitudinal passage therethrough, the first longitudinal passage defining a first longitudinal axis;
   a ferrule floatably mounted at the first housing end within the first longitudinal passage for relative movement between the ferrule and the housing, the ferrule comprising:
      a first end protruding forward of the first housing end, and a second end spaced from the first end and disposed within the first longitudinal passage, the ferrule defining a second longitudinal axis extending from the first end to the second end, and the first end comprises an end face for mating with an end face of an additional ferrule;

at least first and second alignment pin holes in the end face configured for receiving an alignment pin therein, each of the first and second alignment pin holes having a longitudinal direction parallel with the second longitudinal axis, and each pin hole defining an interior surface comprising a plurality of spaced apart longitudinal grooves extending from the end face and into the ferrule; and at least one side wall having a first wall end at the end face and extending from the end face to a second wall end adjacent the second end of the ferrule, the at least one side wall tapering outwardly away from the second longitudinal axis in a direction from the end face towards the second end so that the ferrule is tiltable within the housing passage to offset the second longitudinal axis with respect to the first longitudinal axis.

2. The connector of claim 1, wherein the interior surface within each of the first and second alignment pin holes comprises at least three longitudinal ridges spaced substantially equidistantly and circumferentially from one another about the internal circumference of the pin holes and separated from one another by one of the plurality of longitudinal grooves, with each of the at least three longitudinal ridges defining an interior surface for contacting an alignment pin to be disposed within the pin hole.

3. The connector of claim 2, wherein the interior surface within each of the first and second alignment pin holes comprises at least three longitudinal ridges spaced at about 120° from one another about the internal circumference of the pin holes, with the longitudinal ridges extending in a circumferential direction at most about 60° along the internal circumference of the pin holes, and the longitudinal grooves disposed between the longitudinal ridges extend at least about 60° along the internal circumference of the pin holes.

4. The connector of claim 2, wherein the at least one side wall comprises a first side wall, a second side wall, a third side wall and a fourth side wall disposed about the second longitudinal axis and each extending from a first wall end at the end face to a second wall end adjacent the second end of the ferrule, wherein the first side wall and the third side wall are disposed opposite one another and the second side wall and the fourth side wall are disposed opposite one another and orthogonal to the first side wall and the third side, and each side wall is independently disposed at a taper angle with respect to the second longitudinal axis.

5. The connector of claim 4, wherein:
the first side wall, the second side wall, the third side wall and the fourth side wall define a rectangular frustum having a first cross-sectional area defining the end face and a second cross-sectional area at the second wall ends, wherein the second cross-sectional area is greater than the first cross-sectional area;

each of the first side wall, the second side wall, the third side wall, and the fourth side wall are disposed at the same taper angle with respect to the longitudinal axis; and the ferrule is tiltable within the first longitudinal passage of the housing through a conical deflection about the first longitudinal axis to offset the second longitudinal axis with respect to the first longitudinal axis by an amount of at least the taper angle.

6. The connector of claim 5, wherein:
the second end of the ferrule comprises a flange adjacent the second wall ends, the flange extending laterally away from the second walls ends to define a peripheral shoulder adjacent the second wall ends, the flange defining a third cross-sectional area greater than the second cross-sectional area;

the housing passage comprises a first passage portion at the first housing end and a second passage portion adjacent the first passage portion, wherein:

the first passage portion comprises an interior surface disposed about at least a portion of the ferrule, the interior surface comprising a first surface adjacent the first side wall, a second surface adjacent the second side wall, a third surface adjacent the third side wall, and a fourth surface adjacent the fourth side wall, with the first surface, the second surface, the third surface and the fourth surface each parallel to the first longitudinal axis;

the first side wall, the second side wall, the third side wall and the fourth side wall define a rectangular passage having a shape corresponding to the second cross-sectional area of the ferrule, and the first passage portion has a cross-sectional area greater than the second cross sectional area and less than the third cross-sectional area; and the second passage portion has a cross-sectional area greater than the third cross-sectional area to define an internal shoulder extending around the interior surface between the first passage portion and the second passage portion; and the ferrule fits within the housing passage with the first end of the ferrule extending through the first passage portion and the ferrule flange in the second passage portion; and the connector further comprises a biasing device for biasing the peripheral shoulder of the ferrule flange into engagement with the internal shoulder.

7. The connector of claim 6, wherein at least one of the peripheral shoulder of the ferrule flange and the internal shoulder of the passage comprises a beveled corner for engaging the other of the internal shoulder and the peripheral shoulder for centering the ferrule within the first passage portion under bias of the biasing device.

8. The connector of claim 7, wherein:
the connector is an MPO connector;
the ferrule comprises an MT ferrule;
the taper angle is about 3°; and
the interior surface within each of the first and second alignment pin holes comprises at least three longitudinal ridges spaced at about 120° from one another about the internal circumference of the pin holes, with the longitudinal ridges extending in a circumferential direction at most about 60° along the internal circumference of the pin holes, and the longitudinal grooves disposed between the longitudinal ridges extend at least about 60° along the internal circumference of the pin holes.

9. An optical ferrule comprising:
a housing, the housing comprising:
a first end, a second end spaced from the first end, and a longitudinal axis extending from the first end to the second end, wherein the first end comprises an end face for mating with an end face of an additional optical ferrule;

at least one passage extending through the housing and configured for receiving at least one optical fiber therein for termination of the at least one optical fiber at the end face; and at least one side wall extending from the end face towards the second end, the at least one side wall tapering outwardly away from the longitudinal axis in a direction from the first end to the second end.

10. The ferrule of claim 9, wherein the at least one side wall comprises a plurality of side walls disposed about the longitudinal axis and extending from the end face towards the second end, and each of the side walls tapers outwardly away from the second longitudinal axis in the direction from the end face towards the second end.

11. The ferrule of claim 9, wherein the at least one side wall comprises a first side wall, a second side wall, a third side wall and a fourth side wall disposed about the longitudinal axis and each extending from a first wall end at the end face to a second wall end adjacent the second end of the ferrule, wherein the first side wall and the third side wall are disposed opposite one another, the second side wall and the fourth side wall are disposed opposite one another and orthogonal to the first side wall and the third side, and each side wall is independently disposed at a taper angle with respect to the longitudinal axis.

12. The ferrule of claim 11, wherein the first side wall, the second side wall, the third side wall and the fourth side wall define a rectangular frustum having a first cross-sectional area defining the end face and a second cross-sectional area at the second wall ends, wherein the second cross-sectional area is greater than the first cross-sectional area.

13. The ferrule of claim 12, wherein each of the first side wall, the second side wall, the third side wall, and the fourth side wall are disposed at the same taper angle with respect to the longitudinal axis.

14. The ferrule of claim 13, wherein:
the optical ferrule comprises an MT ferrule;
the taper angle is about 3°;
the ferrule housing additionally comprises at least first and second alignment pin holes extending through the housing from the end face to the second end, and configured for receiving an alignment pin therein, each of the first and second alignment pin holes having a longitudinal direction parallel with the longitudinal axis, and each pin hole defining an interior surface comprising a plurality of spaced apart longitudinal grooves extending from the end face;
the second end of the ferrule comprises a flange adjacent the second wall ends, the flange extending laterally away from the longitudinal axis and second walls ends to define a peripheral shoulder adjacent the second wall ends, the flange defining a third cross-sectional area greater than the second cross-sectional area; and
the peripheral shoulder comprises a beveled corner.

15. An optical ferrule comprising:
a housing, the housing comprising:
a first end, a second end spaced from the first end, and a longitudinal axis extending from the first end to the second end, wherein the first end comprises an end face for mating with an end face of an additional optical ferrule;
at least one passage extending through the housing and configured for receiving at least one optical fiber therein for termination of the at least one optical fiber at the end face; and
at least first and second alignment pin holes in the end face configured for receiving an alignment pin therein, each of the first and second alignment pin holes having a longitudinal direction parallel with the longitudinal axis, and defining an interior surface comprising a plurality of spaced apart longitudinal grooves extending from the end face and into the housing.

16. The optical ferrule of claim 15, wherein the interior surface within each of the first and second alignment pin holes comprises at least two longitudinal ridges spaced circumferentially from one another about the internal circumference of the pin holes, and separated from one another by one of the plurality of longitudinal grooves, with each of the at least two longitudinal ridges defining an interior surface for contacting an alignment pin to be disposed within the pin hole.

17. The optical ferrule of claim 16, wherein:
the interior surface for contacting an alignment pin define a first internal diameter within the pin hole and the longitudinal grooves have a base defining a second internal diameter within the pin hole;
the second internal diameter is greater than the first internal diameter; and
the first internal diameter corresponds to a diameter of an alignment pin to be disposed within the pin hole.

18. The optical ferrule of claim 17, wherein:
the pin holes have n longitudinal ridges separated by n longitudinal grooves;
the n longitudinal ridges are disposed equidistantly from one another on the interior surface and spaced at 360°/n from one another along the internal circumference of pin hole, and each ridge extends in a circumferential direction at most about 360°/2n along the internal circumference of the pin holes; and
the n longitudinal grooves are disposed equidistantly from one another on the interior surface and spaced at 360°/n from one another along the internal circumference of pin hole, and each groove extends in a circumferential direction at least about 360°/2n along the internal circumference of the pin holes.

19. The optical ferrule of claim 18, wherein:
the optical ferrule is configured to be mated with an additional optical ferrule with the end face of the optical ferrule in face-to-face contact with the end face of the additional optical ferrule; and
the longitudinal ridges and longitudinal grooves within each pin hole of the optical ferrule are configured so that when mated, the longitudinal ridges of the optical ferrule are aligned with the longitudinal grooves of the additional optical ferrule, and the longitudinal grooves of the optical ferrule are aligned with the longitudinal ridges of the additional optical ferrule.

20. The optical ferrule of claim 19, wherein:
the optical ferrule comprises an MT ferrule;
n is three;
the longitudinal ridges are disposed at about 120° from one another and extend in a circumferential direction at most about 60° along the internal circumference of the pin holes;
the longitudinal grooves disposed between the longitudinal ridges extend at least about 60° along the internal circumference of the pin holes;
the housing further comprises a first side wall, a second side wall, a third side wall and a fourth side wall disposed about the second longitudinal axis and each extending from a first wall end at the end face to a second wall end adjacent the second end, wherein the first side wall and the third side wall are disposed opposite one another and the second side wall and the fourth side wall are disposed opposite one another and orthogonal to the first side wall and the third side, and each side wall is disposed at a taper angle of about 3° with respect to the second longitudinal axis;

the pin holes are disposed adjacent the second and fourth side walls and have a top disposed towards the first side wall and a bottom disposed towards the third side wall; and each pin hole has one of the three grooves at the top and one of the three ridges at the bottom.

* * * * *